(12) United States Patent
Kanzler et al.

(10) Patent No.: US 6,782,960 B2
(45) Date of Patent: Aug. 31, 2004

(54) TRACKED VEHICLE

(75) Inventors: Helmut Kanzler, Vöhringen (DE); Michael Kuhn, Achstetten (DE)

(73) Assignee: Kaessbohrer Geländefahrzeug AG, Laupheim (DE)

( * ) Notice: Subject to any disclaimer, the term of this patent is extended or adjusted under 35 U.S.C. 154(b) by 6 days.

(21) Appl. No.: 10/281,922

(22) Filed: Oct. 25, 2002

(65) Prior Publication Data

US 2003/0089535 A1 May 15, 2003

(30) Foreign Application Priority Data

Oct. 30, 2001 (DE) .......................... 101 54 650

(51) Int. Cl.$^7$ ............................ B62D 11/02
(52) U.S. Cl. ..................... 180/9.44; 180/6.62
(58) Field of Search ................. 180/6.2, 6.24, 180/6.26, 6.3, 6.48, 6.62, 6.7, 9.1, 9.44

(56) References Cited

U.S. PATENT DOCUMENTS 3,692,119 A * 9/1972 Tucker ................. 180/9.4
3,994,352 A * 11/1976 Siorek ................. 180/9.1
4,754,824 A 7/1988 Olsson ................. 180/6.48

FOREIGN PATENT DOCUMENTS

EP   0 937 614   8/1999 ............. B60T/8/00

* cited by examiner

Primary Examiner—Lesley D. Morris
Assistant Examiner—Matthew Luby
(74) Attorney, Agent, or Firm—Douglas B. Teaney

(57) ABSTRACT

A tracked vehicle with a drive system, which performs driving, braking, directional change, and steering functions as a function of corresponding control commands from an electronic control unit. According to the invention, at least one separate brake system, which operates without current, is provided, which can be enabled by at least one actuating element, which also acts in the absence of current, when a function parameter exceeds or falls below at least one limit value.

10 Claims, 5 Drawing Sheets

TRACKED VEHICLE

BACKGROUND OF THE INVENTION

The invention pertains to a tracked vehicle with a drive system which performs driving, braking, directional change, and steering functions as a function of corresponding control commands from an electronic control unit.

A tracked vehicle of this type for use on ski slopes is generally known through similar ski slope vehicles of the applicant. The chassis of a known tracked vehicle of this type has a left side and a right side, each of which has its own chain drive. Each chain drive is driven by a hydraulic drive system, which has a hydraulic pump unit on each side of the chassis. The two hydraulic pump units are driven by an internal combustion engine, which acts by way of a power divider. The engine can be either a diesel or a spark-ignition engine. Each chain drive has at least one drive wheel, which is driven by a hydraulic motor, which motor is part of the hydraulic drive system. Steering operations, accelerations and decelerations, and changes of driving direction by switching between forward and reverse are carried out by appropriate actuation of the hydraulic motors for the chain drives on the two sides of the vehicle in different ways. By actuating the chain drives on the left and right side differently, it is possible to steer the vehicle. The hydraulic motors are actuated by appropriate hydraulic control means, which are operated in turn by a central electronic control unit.

SUMMARY OF THE INVENTION

The task of the invention is to create a tracked vehicle of the type indicated above which makes it possible to control the tracked vehicle even after the electronic control unit has failed or malfunctioned.

This task is accomplished by the provision of at least one separate brake system which operates without current and which can be enabled by at least one actuating element, which acts in the absence of current, when a function parameter of the drive system exceeds or falls below at least one limit value. The brake system ensures that, even in the case of an electronic failure, an electronic shut-off, or an electronic malfunction, it is still possible for the driver to control the vehicle and in particular to brake it to a stop. If the drive system of the tracked vehicle has a hydraulic drive, the pressure in the corresponding hydraulic circuit is especially suitable as the function parameter. Depending on the purpose, it is possible to define one or more pressure limits, above or below which the brake system is automatically enabled by appropriate automatic actuation. A suitable actuating element for a hydraulic system is a hydraulic valve which switches from one state to another as a function of pressure.

In an elaboration of the invention, the brake system has at least one function-monitoring means. Because the separate brake system may possibly never be used during normal operation of the tracked vehicle, a failure of this brake system would not necessarily be noticed. Thus the function-monitoring means are provided, which ensure that, when the variable in question exceeds or falls below the selected limit, the brake system will function reliably. The brake system preferably has brake devices on both sides of the vehicle, and these brake devices can be actuated in different ways so that steering operations can also be performed.

As a further elaboration of the invention, the minimum of one actuating element can switch the brake system from its rest mode to a steering function mode or to a braking function mode when the function parameter exceeds or falls below one or another limit. Especially for the sake of the steering function, the brake system must be able to actuate the two sides of the tracked vehicle in different ways. For this purpose, a separate brake device is preferably assigned to each side of the vehicle. The braking function mode is required especially in cases where the braking force which can be provided by the similar braking function of the drive system is not sufficient in and of itself to decelerate the vehicle to the extent intended by the driver of the vehicle when he pushes down forcefully on the brake pedal and thus produces a strong braking pressure. A steering function mode is necessary especially for cases in which the electronic circuitry of the vehicle fails, because otherwise it would not be possible to control the vehicle.

As a further elaboration of the invention in which the electronic control unit can actuate the drive system to perform steering functions by electronically converting control movements of a manually operated controller, the manual controller has a mechanical connecting element, which, upon the failure of the electronic control unit, can be enabled by an automatic actuator to establish the control connection between the manual controller and the drive system and/or the separate brake system. Because the control commands are transmitted from the manual controller to the drive system by purely electronic means in this design, it must be guaranteed that the tracked vehicle can still be controlled even after the failure of the electronic circuitry. The provision of a mechanical connection, which can be enabled when needed, between the manually operated controller and the drive system or the separate brake system means that the tracked vehicle can be steered under any conditions.

As a further elaboration of the invention, a brake device which is fed by at least one separate energy-supply circuit and which is thus independent of the hydraulic drive system is assigned to each side of the chassis as part of the brake system. The manual controller is connected mechanically to at least one actuating element of the energy supply circuit. When the electronic control unit fails, this actuating element is enabled by an automatic actuator, which operates in the absence of current. The actuating element can thus proceed to actuate the brake devices on both sides as a function of corresponding steering movements of the manual controller. The energy supply circuit for the brake device in question, which is independent of the hydraulic drive system, can be electrical, pneumatic, or hydraulic. Of course, the brake devices themselves can also be integrated electrically, pneumatically, or hydraulically into the system in a corresponding manner. The solution according to the invention guarantees that, even after the electronic circuitry fails or is turned off or malfunctions, it still remains possible to steer the vehicle at least until it can be brought to a stop. As a result of this feature, which is especially relevant in terms of safety, it becomes possible for the tracked vehicle to be approved for highway operation in spite of the purely electronic control of its travel direction.

As a further elaboration of the invention, a hydraulic circuit is provided as the energy supply circuit. This circuit is fed by a pump device, which is connected mechanically to at least one side of the vehicle in such a way that the coasting of the tracked vehicle can supply the pump device with sufficient feed pressure. This ensures that there will always be sufficient feed pressure available to actuate the brake system. The mechanical connection between the minimum of one pump device and components which rotate when the vehicle is coasting means that the pump device will continue to operate under these conditions and that the necessary feed pressure can be maintained, provided that the minimum of one pump device is designed properly to work with the brake system.

As a further elaboration of the invention, an automatic pressure control valve, which actuates the two hydraulic circuits and the associated brake devices in a manner proportional to the steering movements of the manual controller, is used as the actuating element. When the vehicle is traveling straight ahead, the pressures in the two hydraulic circuits will be kept equal. When a steering movement is made, the pressure in one of the hydraulic circuits will become lower than that in the other circuit. The desired brake device will thus execute the corresponding braking function, as a result of which the speed of the chain drive in question is reduced as intended.

As a further elaboration of the invention, each brake device has a mechanical brake, especially a multi-disk brake, which acts on the sprocket wheel on the side of the chassis in question. This is a design which offers an especially high degree of functional reliability and also allows the transmission of high braking forces.

As a further elaboration of the invention, a double-acting multi-disk brake is provided. This multi-disk brake is preferably provided with two brake pistons or brake disks, which can be actuated independently of each other and each of which acts on a corresponding stack of plates.

As a further elaboration of the invention, at least one pressure sensor is integrated into the minimum of one energy supply circuit of the minimum of one brake device to monitor the function of the device. This pressure sensor is connected to the electronic control unit. A hydraulic circuit is provided as the energy supply component in this design.

As a further elaboration of the invention, at least one actuating element which switches from one state to another as a function of pressure is assigned to the minimum of one energy supply circuit, and a position sensor is assigned to the automatic actuating element. These two function-monitoring components are connected to the electronic control unit and make it possible to monitor the operational status of the brake system.

BRIEF DESCRIPTION OF THE FIGURES

Additional advantages and features of the invention can be derived from the claims and from the following description of preferred exemplary embodiments of the invention, which are explained on the basis of the figures:

DETAILED DESCRIPTION OF THE DRAWINGS

Figure 1:
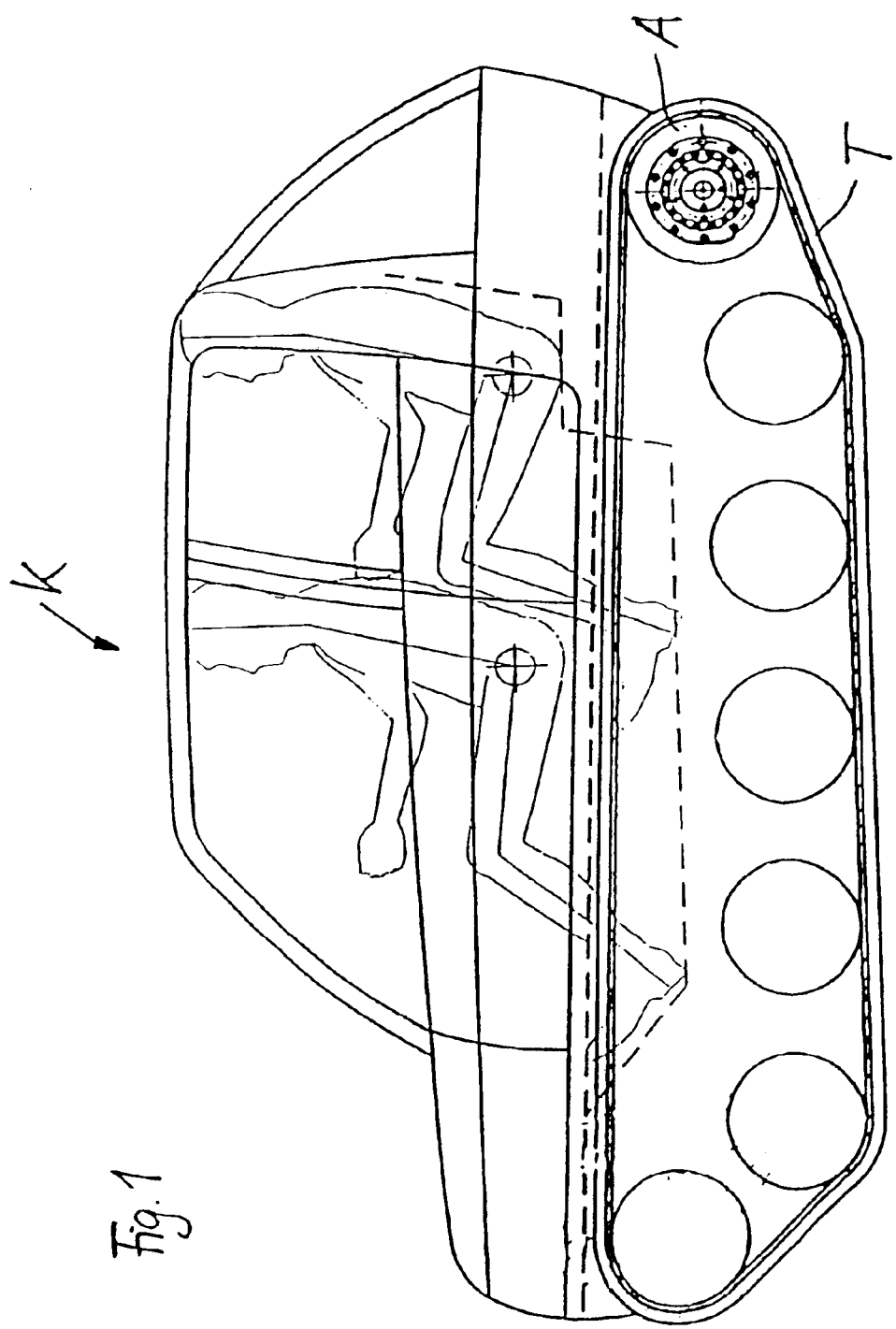
FIG. 1 shows a schematic diagram of an embodiment of a tracked vehicle according to the invention.
Figure 2:
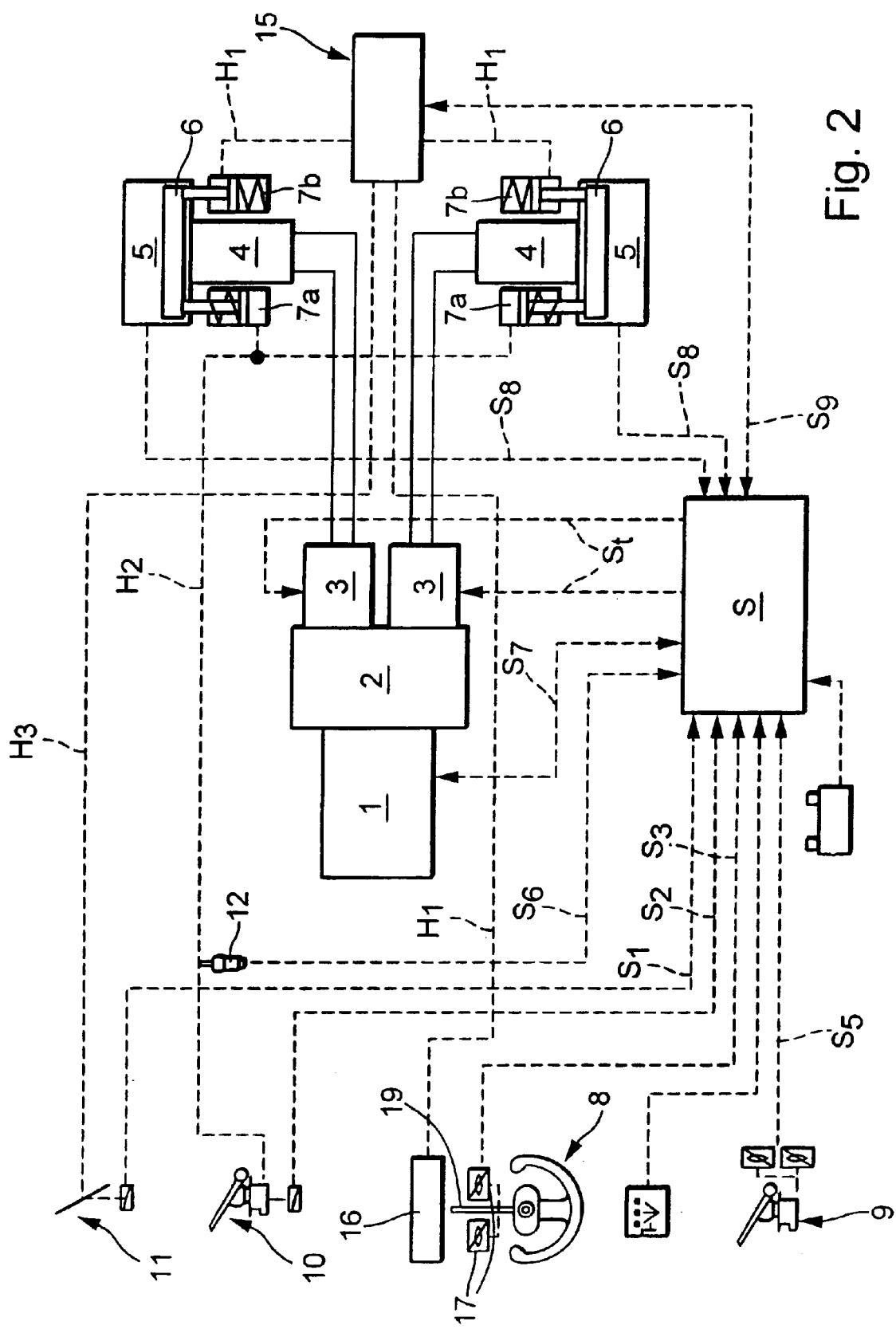
FIG. 2 shows a block circuit diagram of a drive system suitable for the tracked vehicle according to FIG. 1.

A tracked vehicle K according to FIG. 1 is provided with a chain drive T on each of its two opposite sides. Each chain drive T has a revolving chain or tread, which is driven by a sprocket wheel A. Each chain drive T is part of one side of the chassis. In addition to the chain drive T, each chassis side also has a hydraulic drive system, to be described in greater detail below, which is part of a drive system according to the invention and each of which acts on the sprocket wheel A serving as the drive wheel for each side of the chassis. Each of the hydraulic drive systems for the two sides of the chassis has a hydraulic motor 4, which drives the sprocket wheel A of the associated chain drive T by way of a transmission 5. The hydraulic drive system for each side of the chassis is provided with a pump unit in the form of a hydraulic pump (FIG. 2). The two hydraulic pumps 3 are driven by a central internal combustion engine 1, acting by way of a power divider 2. The internal combustion engine 1 in the exemplary embodiment illustrated here is designed as a spark-ignition engine. It would also be possible to provide a diesel engine.

Both the driving movements of the tracked vehicle K and also the changes in the direction of its travel are produced by an electronic control unit 5, which actuates the appropriate hydraulic pumps 3 of the associated hydraulic drive systems by sending signals along control lines St. To accelerate or decelerate the tracked vehicle, both hydraulic pumps 3 are actuated in a synchronized manner, as a result of which the two hydraulic motors 4 reduce or increase the drive rpm's synchronously in a continuously variable manner. A gas pedal 9, which is connected to the electronic control unit S by means of a signal line $S_5$, is provided as a set-point adjuster for corresponding accelerations, maintenance of a constant speed, or decelerations of the vehicle's velocity. So that sharp decelerations, that is, braking operations, can be accomplished which are beyond the ability of the hydraulic motors to bring about by themselves in response to the actuation of the brake pedal, the brake pedal 10 (connected by signal line $S_2$ to control unit S) is able to act directly on a hydraulic brake circuit $H_2$. This hydraulic brake circuit comprises two brake devices 6, one of which is on each side of the vehicle. The brake devices 6 in the exemplary embodiment illustrated here are designed as multi-disk brakes and can be actuated by brake pistons 7a, which are also part of the hydraulic brake circuit $H_2$. The hydraulic brake circuit $H_2$ is activated only when the pressure in the hydraulic brake circuit $H_2$ exceeds a certain limit. When other brake pedal actuations occur which do not increase the hydraulic pressure to 30 bar or more, the brake pressure in question is recorded by a pressure sensor 12, which is connected by a signal line $S_6$ to the electronic control unit S. This control unit S then actuates the corresponding hydraulic motors 4 in appropriate fashion to achieve the desired deceleration of the vehicle.

When an extremely strong pressure is exerted on the brake pedal 10 to bring about an extremely sharp deceleration and the threshold value or pressure limit set for the system pressure in the hydraulic brake circuit $H_2$ is therefore exceeded, the braking function occurs no longer exclusively by actuation of the hydraulic motors 4 under the command of the electronic control unit S but rather additionally via the action of the hydraulic circuit $H_2$ on the brake devices 6. In the present exemplary embodiment, the brake devices 6 are activated when the pressure exceeds a limit or threshold value of 30 bar. The multi-disk brakes 6 serving as brake devices are assigned to the sprocket wheels in the area of the transmission 5; the brakes are actuated by brake pistons 7a, which are spring-loaded in the release direction. The force of the restoring springs of the brake pistons 7a on each side of the chassis is designed so that the multi-disk brakes 6 remain disengaged up to the corresponding threshold value, which is 30 bar in the present case. As soon as the brake pressure in the hydraulic circuit $H_2$ exceeds this threshold of 30 bar, the disks of the multi-disk brakes 6 are squeezed together, as a result of which the desired braking function is applied to the two sprocket wheels A and thus to the associated chain drives. The multi-disk brakes can be used as an alternative to the use of the hydraulic motors 4, but it is also possible for the action of the multi-disk brakes 6 to supplement the action of the hydraulic motors 4 by way of the hydraulic circuit $H_2$. Because a braking function which is independent of the electronic control unit S and thus also independent of the power supply is available above the predetermined threshold value, the vehicle can be brought to a stop in the event of the failure, shut-off, or malfunction of the electronic control unit S by exerting sufficient pressure on the brake pedal.

Figure 3:
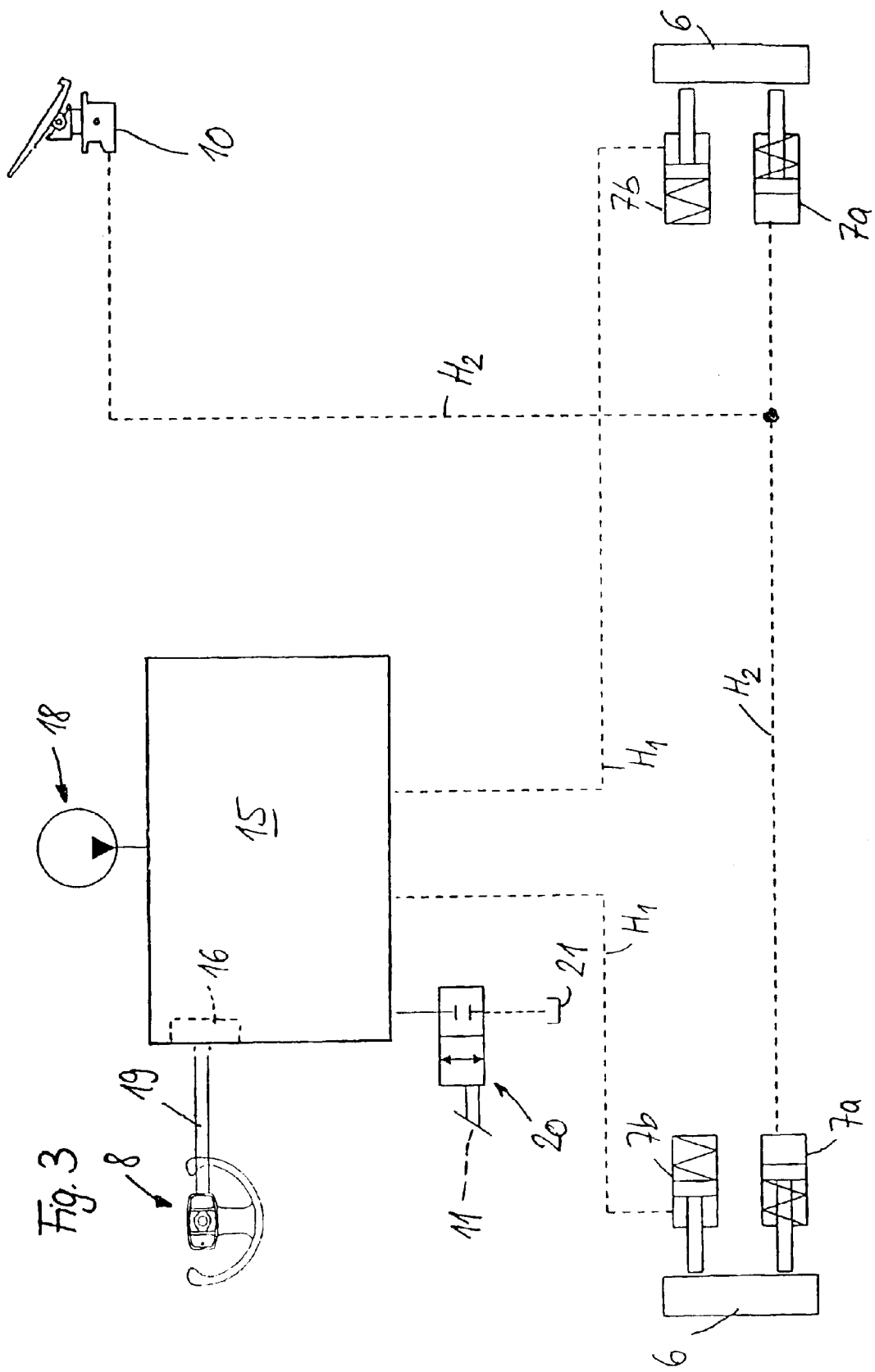
FIG. 3 shows a schematic diagram of an actuating system for an emergency steering function of a brake system for the tracked vehicle according to FIG. 1.

The brake pistons 7b can be actuated supplementally by a parking brake 11 (connected by signal line $S_1$ to control unit S), which is designed in the present case as a hand brake. For this purpose, as can be seen in FIG. 3, a control valve 20, which opens or closes the return path to a tank 21 for the appropriate hydraulic oil, serves as the actuating element and is assigned to a hydraulic line $H_3$, which is connected to the brake cylinders 7b. When the hand brake 11 is in the released position, the compression spring arrangements, serving as energy storage devices for each of the two brake cylinders 7b, are also released, because there is pressure in the hydraulic lines. When the hand brake 11 is pulled, that is, actuated, the return path to the tank 21 is opened by the appropriate actuation of the control valve 20, as a result of which the pressure in the hydraulic line $H_3$ falls below a defined pressure limit, which, in the present case, is a threshold value of 15 bar. This threshold value represents the switching threshold for the brake pistons 7b, so that the compressive forces of the energy storage devices assigned to the brake pistons 7b are now able to exert the desired mechanical braking function on the associated multi-disk brakes.

The brake pistons 7b are independent of the brake pistons 7a, and each one acts on the same multi-disk brake 6 in the same way as the associated brake piston 7a. Each multi-disk brake 6 is therefore double-acting.

The actuation of the brake pistons 7b has yet another essential function, to be described below. For the purpose of steering the vehicle during normal operation, the two hydraulic pumps 3 are actuated in different ways by the electronic control unit S. By the reduction of the rpm's of the one hydraulic motor 4 and/or by the increase in the rpm's of one of the hydraulic motors 4, the two chain drives can be made to operate at different speeds, as a result of which the desired steering is achieved. These changes in travel direction are initiated by the steering movements exerted on a manual controller in the form of a steering wheel 8, the rotational movements of which are detected by potentiometers 17. These are connected by a signal line $S_3$ to the electronic control unit S, so that the control unit S is able to detect each and every steering movement of the manual controller 8 and to convert it into the desired control command for the hydraulic pumps 3. So that it is still possible to steer the vehicle even after the power supply has failed or after the on-board electronic circuitry or especially the electronic control unit S has been turned off or has malfunctioned or after the failure of the electronic system for any other reason, the tracked vehicle is equipped with a hydraulic emergency steering system 15. For this purpose, an additional hydraulic circuit $H_1$ is provided, which acts by way of the brake pistons 7b on the multi-disk brakes 6 on the two sides of the chassis and thus on the two chain drives. To detect a failure of the electronic circuitry, the emergency steering system 15 has an electrically actuated automatic actuator, a magnetic valve in the present case, which is supplied with electric current during normal operation, that is, while the electronic control unit S is operating. This magnetic valve is integrated Into the emergency steering valve 16 shown in FIG. 2. As soon as the magnetic valve is no longer being supplied with current as a result of the voltage drop which occurs when the on-board electronic system fails or is turned off, the hydraulic actuating element, which is also integrated into the emergency steering valve 16, of the hydraulic circuit $H_1$ is activated. The hydraulic actuating element is an automatic pressure control valve, which is actuated by the steering movements of the steering wheel 8, which are transmitted by a mechanical connection 19. Depending on the steering movement, the automatic pressure control valve within the emergency steering valve 16 decreases the pressure in the one hydraulic circuit $H_1$ (FIG. 3) and/or increases the pressure in the other hydraulic circuit $H_1$ or keeps the pressures constant. In the present exemplary embodiment, the required system pressure for keeping the brake piston 7b in question in the released state against the elastic force of its associated compression spring arrangement is defined as 15 bar. This is the limit pressure or threshold value, which represents the switching threshold for the multi-disk brakes 6 on each side of the vehicle. As soon as the pressure falls below this threshold, the elastic forces of the now-active energy storage devices in the form of a compression spring arrangements begin to act on the brake pistons 7b, thus causing the multi-disk brakes 6 to perform their braking function. The steering wheel 8 is held centered in a zero position to make it easier to steer the tracked vehicle.

To guarantee that a sufficient feed pressure of more than 15 bars, that is, a feed pressure above the lower threshold, will always be available in the hydraulic lines $H_1$, at least one feed pump 18 is provided, which is connected mechanically for rotation in common to a part of the tracked vehicle which rotates as the vehicle travels. As a result, the minimum of one feed pump 18 is forced to turn as the tracked vehicle coasts, the pumping function of the minimum of one feed pump 18 being engineered in such a way that this forced turning is sufficient to generate the desired feed pressure of more than 15 bar.

Several signal or control lines $S_7$–$S_9$ are also assigned to the electronic control unit S. These lines are described briefly below. The signal and control line $S_7$ is connected to the electronic control system of the internal combustion engine 1 and makes it possible for the rpm's of the engine 1 to be controlled. The signal lines $S_8$ connect speed sensors on the sprocket wheels, which serve as drive wheels, to the electronic control unit S. As a result, feedback is obtained concerning the accelerations, decelerations, velocities and travel directions actually produced by the hydraulic motors 4 or by the brake pistons 7a, 7b. This data can be used by the electronic control unit S for evaluation. The data transmission line (or function monitoring means) $S_9$ is used to monitor the function of the emergency steering system 15, as will be explained in detail below on the basis of the drawings in FIGS. 4–7.

The embodiments according to FIGS. 4 and 6 and according to FIGS. 5 and 7 correspond to the embodiment described previously on the basis of FIGS. 1–3, except for the differences to be presented below. The essential difference in the embodiments according to FIGS. 4 and 6 and in those according to FIGS. 5 and 7 is that, by means of these embodiments, the emergency steering function described in detail above on the basis of FIGS. 1–3 can be monitored. This guarantees that the electronic control unit S can immediately detect the failure of the emergency steering function during normal operation of the tracked vehicle. During normal operation, the tracked vehicle is steered electronically, which means that driver of the vehicle would be unable to notice a possible failure of the hydraulic emergency steering system. The embodiments described below provide the functional fallback plane to which resort can be had when the electronic control system fails. It is sufficient and therefore advantageous for the electronic control unit to conduct the corresponding function check each time the tracked vehicle is started up.

Figure 4:
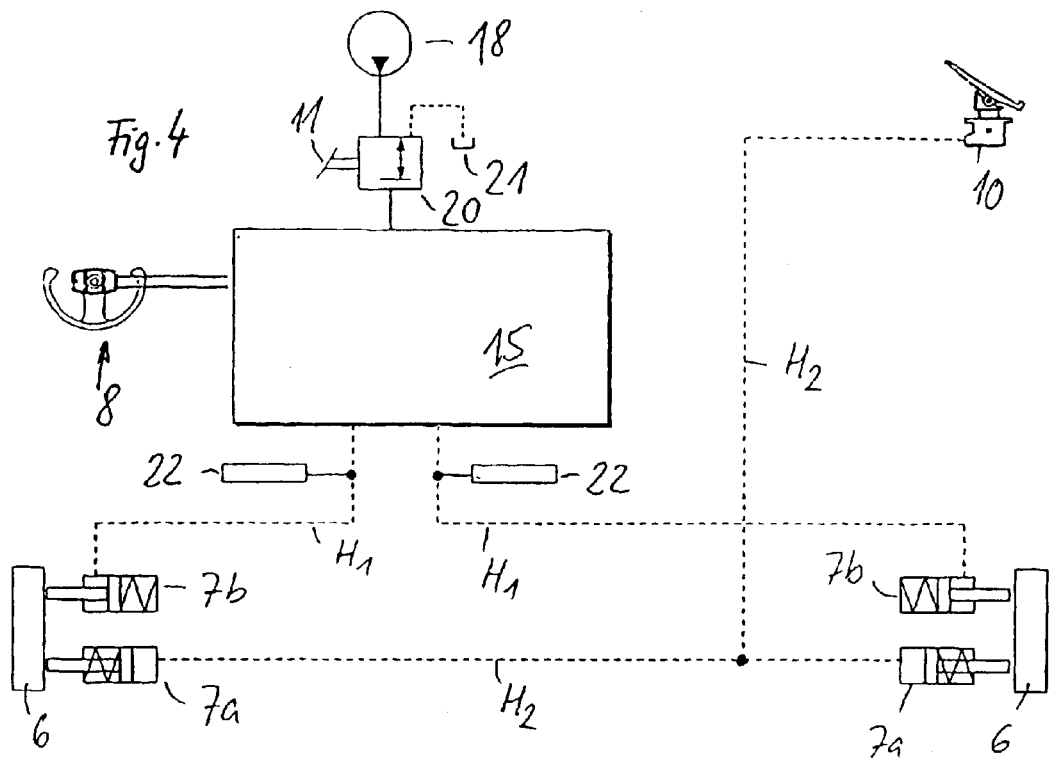
FIG. 4 shows a schematic diagram of another embodiment of a brake system, similar to that of FIG. 3.
Figure 5:
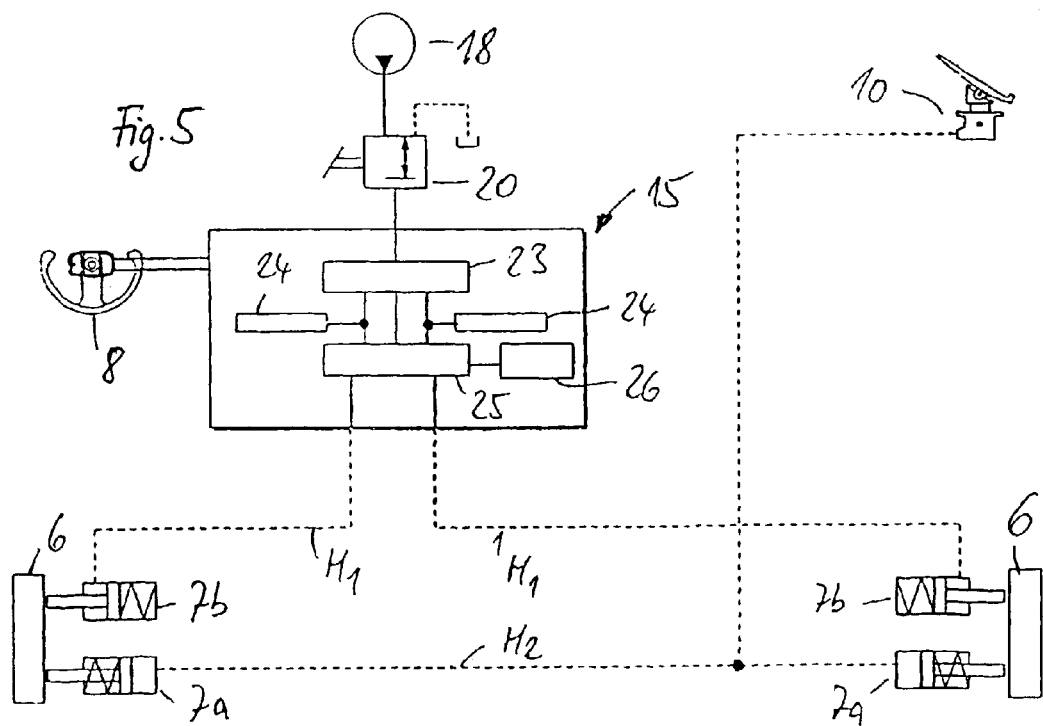
FIG. 5 shows a schematic diagram of another embodiment of a brake system, similar to that of FIG. 4.
Figure 6:
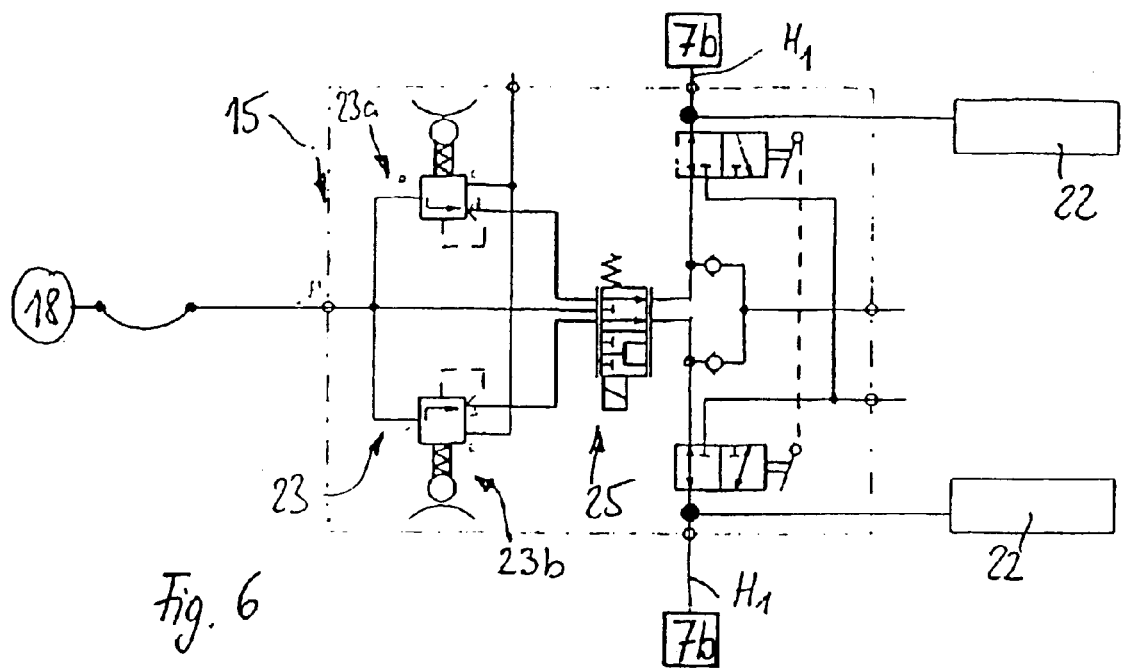
FIG. 6 shows a detailed block circuit diagram of part of the brake system according to FIG. 4.
Figure 7:
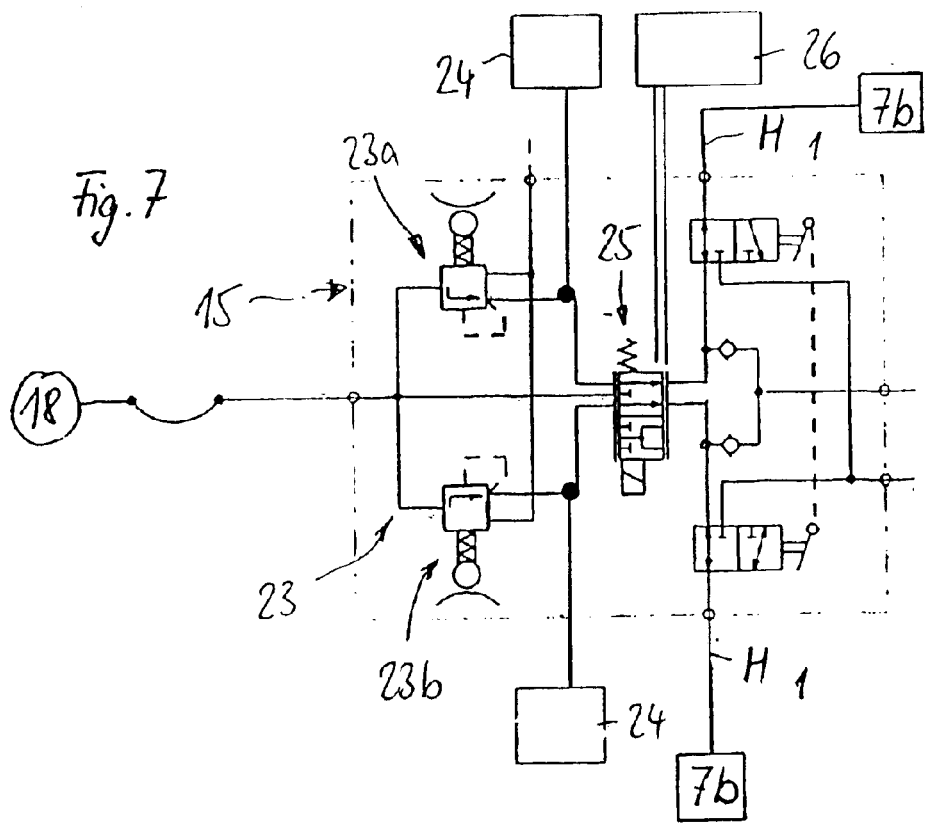
FIG. 7 shows a detailed block circuit diagram of part of the brake system according to FIG. 5.

The exemplary embodiment according to FIGS. 4 and 6 and also the embodiment according to FIGS. 5 and 7 show detailed designs for an emergency steering function. With respect to the design itself, except for the monitoring means (to be described in greater detail below), either of these embodiments can be used for the emergency steering function of the embodiment according to FIGS. 1–3. For this purpose, two units are installed downline from the feed pump 18. First, a steering unit 23 is connected mechanically to the steering wheel 8; and, second, a release unit 25, which represents an automatic actuator, is provided, which switches automatically to the functional position when the electronic system fails. The steering unit 23 has two pressure reducers 23a, 23b, which are assigned to the right and left hydraulic circuits $H_1$ for actuating the brake pistons 7b of the multi-disk brakes 6 on the two sides of the vehicle. As the release unit or automatic actuator 25, a 5/2-port directional control valve is provided, which, in the diagrams of FIGS. 6 and 7, is shown in its currentless state. In the current-carrying state, the hydraulic circuit $H_1$ is on the same pressure level as the feed pump 18 and establishes the connection to the brake pistons 7b. In addition, a 3/2-port directional control valve is also assigned to each circuit $H_1$; these valves can be actuated jointly when the tracked vehicle is towed to release the multi-disk brakes, so that the vehicle can be towed by another vehicle. In the embodiment according to FIGS. 4 and 6, two pressure sensors 22 are integrated into the lines $H_1$ near the multi-disk brakes 6 to monitor the function of the system by detecting the line pressure in the two lines $H_1$.

In a manner not shown in and of itself, an actuation switch is provided near the hand brake 10 in order to detect whether the hand brake 10 is in the released or actuated state.

In the exemplary embodiment according to FIGS. 4 and 6 and also in that according to FIGS. 5 and 7, the automatic pressure controllers or pressure reducers 23a, 23b reduce the feed pressure to about 14 bar. When one of the steering potentiometers detects a steering movement toward the left, the pressure rises on the right and falls on the left. When a steering movement toward the right is detected, the pressure falls on the right and rises on the left. This can be detected by the pressure sensors 22. If the pressure fails to reach 14 bar, one of the two pressure controllers 23a, 23b must be defective. The pressure falls to 0 bar in particular when a spring in one of the two pressure controllers 23a, 23b breaks.

When the 5/2-port directional control valve 25 is receiving current, the pressure is automatically adjusted to the appropriate value when the hand brake is actuated. The actuation switch (described above) detects the position of the hand brake at the moment in question. When the hand brake is released, there must a feed pressure of more than 16 bar at a pump speed of preferably more than 900 rpm. The switching function of the automatic actuator 25, that is, of the 5/2-port directional control valve, and of the pressure controllers 23a, 23b can still be monitored even if there is a defect in one of the pressure sensors.

In the case of the embodiment according to FIGS. 5 and 7, the two pressure controllers 23a, 23b are monitored by two pressure switches 24. The released or actuated position of the hand brake is monitored by another pressure switch (not shown). In addition, the position of the automatic actuator in the form of a 5/2-port directional control valve is detected by a position switch 26. The position switch 26 tells the electronic control unit whether the 5/2-port directional control valve is in its powered-up or powered-down position. A pressure drop at one of the pressure controllers 23a, 23b can be detected by the pressure switch, which means that is also possible to detect the failure of a pressure controller 23a, 23b.

All of the function monitoring means described above are connected to the electronic control unit S, which, when the vehicle is to be restarted, checks the various functions and on that basis can grant or deny the request to start the vehicle.

What is claimed is:

1. A tracked vehicle with a drive system, which performs driving, braking, directional change, and steering functions as a function of corresponding control commands from an electronic control unit, characterized in that at least one separate brake system ($H_1$, $H_2$, 6, 7a, 7b), which operates without current, is provided, which can be enabled by at least one actuating element, which also acts in the absence of current, when a certain function parameter of the drive system exceeds or falls below at least one limit value, where the drive system can be actuated to perform steering functions by electronic conversion of the control movements of a manually operated manual controller by the electronic control unit, characterized in that the manual controller (8) has a mechanical connecting element (19), which, when the electronic control unit (S) fails, can be enabled by an automatic actuator (16) to establish the control connection between the manual controller (8) and the drive system and/or the separate brake system.

2. The tracked vehicle according to claim 1, characterized in that at least one function-monitoring means ($S_9$) is assigned to the brake system.

3. The tracked vehicle according to claim 1, characterized in that the brake system can be converted from its rest mode to a steering function mode or to a braking function mode by the minimum of one actuating element as a function of whether the function parameter exceeds or falls below various limit values.

4. The tracked vehicle according to claim 1 with a chassis with two sides and with a hydraulic drive assigned to each side, these hydraulic drives forming part of the drive system, characterized in that, as part of the brake system, each side of the chassis has its own brake device (6), which is independent of the hydraulic drive system and which is fed by at least one separate energy supply circuit ($H_1$), and in that the manual controller (8) is mechanically connected to at least one actuating element (16) of the energy supply circuit ($H_1$), which element can be activated as a function of the failure of the electronic control unit (S) by an automatic actuator, which acts in the absence of current, the actuating element thus actuating the brake devices (6) on the two sides of the chassis as a function of corresponding steering movements of the manual controller (8).

5. The tracked vehicle according to claim 4, characterized in that a hydraulic circuit ($H_1$) is provided as the energy supply circuit, which is fed by a pump device (18), the pump device (18) being connected mechanically to at least one side of the chassis in such a way that the coasting of the tracked vehicle (K) supplies the pump with sufficient feed pressure.

6. The tracked vehicle according to claim 4, characterized in that an automatic pressure control valve is provided as the actuating element, which actuates the two hydraulic circuits ($H_1$) and the associated brake devices (6) in a manner proportionate to the steering movements of the manual controller (8).

7. The tracked vehicle according to claim 4, characterized in that each brake device has a mechanically acting brake, which acts on a sprocket wheel (A) on the side of the chassis in question.

8. The tracked vehicle according to claim 7, characterized in that a double-acting multi-disk brake (6) is provided.

9. The tracked vehicle according to claim 4, characterized in that at least one pressure sensor is integrated into the minimum of one energy supply circuit of the minimum of one brake device to monitor the function of the device, this sensor being connected to the electronic control unit (S).

10. The tracked vehicle according to claim 4, characterized in that, to monitor the function of the system, at least one actuating element, which can be switched from one state to another as a function of pressure, is assigned to the minimum of one energy supply circuit, and a position sensor is assigned to the automatic actuator, both the actuating element and the position sensor being connected to the electronic control unit.

* * * * *